Patented Nov. 13, 1951

2,574,864

UNITED STATES PATENT OFFICE 2,574,864

ACYL UREIDE PREPARATION

Eddy W. Eckey, Cincinnati, Ohio, and Andrew Doyle Abbott, Fairfax, Calif., assignors to The Procter & Gamble Company, Cincinnati, Ohio, a corporation of Ohio No Drawing. Application January 2, 1947, Serial No. 719,942

12 Claims. (Cl. 260—404.5)

This invention relates to the preparation of fatty acid amides of urea, generically referred to herein as "acyl ureides."

The acyl ureides are useful in many arts, for example as synthetic resin intermediates; waterproofing agents for wood and textiles; accelerators, softeners and anti-oxidants for rubber; dispersing, flotation and wetting agents for use alone or in combination with other such agents; dye intermediates; and parasiticides.

It is an object of our invention to provide a new and improved process for the preparation of acyl ureides.

It has been suggested to prepare acyl ureides by reacting fatty acid esters of monohydric alcohols (e. g. ethyl stearate), urea, and large quantities of sodium ethylate (a metal alkoxide, also called sodium ethoxide) in the presence of pyridine as an acyl ureide solvent. According to our experience with such a process, however, sodium ethylate reacts with the fatty ester to form soap which promotes the formation of a stable emulsion from which the dissolved ureide can be separated only with difficulty.

We have discovered certain improvements in the production of acyl ureides involving new practices which in part are directly contrary to the recommended procedure of the prior art. In brief, our process involves reacting a suitable fatty ester (as more fully explained below) and urea under conditions which permit precipitation of the acyl ureide as formed. The interchange of radicals during reaction is thereby directed toward desired acyl ureide formation.

Important features of our process are as follows.

First, in our process the fatty acid ester and urea are reacted in the substantial absence of a material having substantial solvent action for the acyl ureide. The use of fluidizing agents to further the reaction, however, such as substantially inert solvents for the ester or substantially inert mutual solvents for the ester and urea, which are not solvents for the acyl ureide is not excluded from the scope of the invention.

Second, instead of employing monohydric alcohol esters of the fatty acid as suggested in the prior art, we employ polyhydric alcohol esters. Polyhydric alcohol esters used in accordance with our invention appear to have less solvent action for the acyl ureide than the corresponding monohydric alcohol esters and their use thereby favors the desired precipitation of the acyl ureides and the direction of the reaction toward their formation.

Third, the metal alkoxide (e. g. sodium ethoxide) is used only in catalytic amounts as a molecular rearrangement catalyst for the reaction between the fatty acid ester and the urea thereby avoiding the formation of large quantities of soap and the attending emulsification complications.

Thus the present process comprises contacting a polyhydric alcohol ester of the fatty acid with urea in the substantial absence of a material having appreciable solvent action for fatty acid ureide but in the presence of catalytic amounts of a suitable molecular rearrangement catalyst at a temperature below the decomposition temperature of urea (that is, below about 150° C.) and within the range of which the lower limit is the lowest temperature at which ester is liquid and the upper limit is the highest temperature at which fatty acid ureide can crystallize from the reaction mix as it is formed, and maintaining the temperature within said range while progressive crystallization of the acyl ureide takes place. A related process of organic radical interchange involving the interesterification of triglycerides in which solid triglycerides precipitate as formed in the reaction is the subject of patent application Ser. No. 562,062 (Patent No. 2,442,531), filed November 6, 1944, by E. W. Eckey, one of the inventors of the present process.

The invention will be more fully understood from the following examples in which the parts are by weight. It is to be understood, however, that the examples are merely illustrative of the manner of practicing the invention and are not to be taken as limiting the scope of the appended claims.

*Example 1.*—200 parts of refined and dried coconut oil, 60 parts of urea, 100 parts of dry tertiary butanol, and 2 parts of sodium methoxide (added as a 10% suspension in xylene) were thoroughly mixed and slowly agitated at about 50° C. for about 72 hours. Acyl ureides formed in the reaction precipitated. After the reaction period, the mixture, which was alkaline to phenolphthalein, was then acidified and dispersed in Skellysolve H (a mixture of commercial hexanes and heptanes in which the ureides are substantially insoluble). This mixture was then treated with water to wash out unreacted urea, tertiary butanol, catalyst residue, and any monoglyceride formed in the reaction. Thereafter the Skellysolve H was distilled off under reduced pressure. The residue containing the acyl ureide and fatty glycerides was then treated with petroleum ether to extract unreacted di- and triglycerides present.

The acyl ureide recovered had a saponification value of 214.0, a melting point of 173.5° C. and a nitrogen content of 10.50%.

*Example 2.*—44 parts of coconut oil, 6 parts of urea, 59 parts of tertiary butanol, and .75 part of sodium methoxide (as a 10% solution in xylene) were thoroughly mixed and the mixture gently agitated for about 20 hours at about 50° C. The reaction mix was thereafter acidified with glacial acetic acid to inactivate the catalyst, then washed on a filter with warm ether to remove ether-soluble triglycerides, then washed with hot water to remove tertiary butanol, unreacted urea, monoglyceride, and other undesired materials soluble or readily dispersible in water.

A 79% yield of an acyl ureide product containing 10.27% nitrogen was recovered.

In the above examples we have shown the use of tertiary butanol as a medium in which to conduct the reaction. This material is not a solvent for the fatty acid ureide formed, but is a substantially inert mutual solvent (fluidizing agent) for the fat and urea and acts to render the mix fluid and effect more intimate contact between the reactants and thereby further the reaction. The reaction between ester and urea will take place in the absence of such fluidizing agents (see Example 3) but their use has the advantage above indicated. Instead of tertiary butanol, other mutual solvents or agents which render the mix fluid but which are substantially inert and which do not have substantial solvent action for the acyl ureide, such as ethyl ether, dioxane, benzene, gasoline, and other hydrocarbons such as hexane, heptane, octane and commercial mixtures thereof may be used.

When fluidizing agents are used in the practice of the invention the proportion employed is not critical. An amount of this material varying from about one third to about twice the combined weight of the ester and urea has been found suitable, but larger or smaller amounts may of course be employed if desirable without departing from the spirit of the invention.

The invention is not to be considered as limited to the use of fatty acid triglycerides, or to glycerin esters in general, as the reactant furnishing the acyl radical. Completely or partially esterified polyhydric alcohols besides glycerol, especially those having not more than four carbons such as glycol, diethylene glycol, propylene glycol and the like may be employed.

*Example 3.*—90 parts of the diester of cottonseed fatty acids and ethylene glycol were mixed with 9 parts of finely ground urea. To this mixture was added 1 part finely divided sodium methoxide. The mixture was heated to 120° F. and vigorously agitated at this temperature for 50 hours. At the end of the run the sodium methoxide was inactivated by the addition of an equivalent amount of glacial acetic acid, unreacted glycol ester was removed by repeated washing with Skellysolve F, and the crude ureide recovered was decolorized with activated carbon and crystallized from alcohol. The resulting cottonseed fatty acid ureide crystallized in white, pearly plates having a slightly greasy feel when rubbed between the fingers. The product had a melting point of 163–165° C. and by analysis contained 8.8% nitrogen as compared with 8.90% theoretical.

Example 3 demonstrates that the reaction of the present invention takes place when a polyhydric alcohol ester other than a glycerin ester is used. More specifically corresponding esters of diethylene glycol and of propylene glycol may be substituted for the glycol ester actually employed.

Example 3 also demonstrates that the reaction of the process takes place in the absence of substantial quantities of a fluidizing agent as used in Examples 1 and 2.

Although the invention finds its greatest use in the preparation of acyl ureides of the higher molecular weight fatty acids, that is, fatty acids having from about 8 to about 22 carbon atoms such as caprylic, capric, lauric, myristic, palmitic, stearic, oleic, linoleic, etc., the ureides of lower fatty acids such as acetic, propionic, butyric, and valeric may be prepared similarly by reaction of a suitable ester thereof with urea in a corresponding manner. Of especial interest, however, are the acyl ureides prepared from mixtures of higher fatty acids such as occur in the natural fats and fatty oils including coconut, palm kernel, babassu, cottonseed, soybean, sunflower seed, sesame, corn, rapeseed, olive, peanut, palm, tallow, herring, sardine, manhaden and others as well as their hydrogenated and partially hydrogenated derivatives.

The products formed in the practice of the present invention are primarily the monoacyl ureides, although some diacyl ureides may be present in small proportion. The monoacyl derivatives constitute the desired product, but it is not necessary to react equivalent amounts of combined fatty acid with the urea in order to effect their formation in predominant proportion. Apparently the diacyl ureides are not readily formed under the conditions of this invention and more than one equivalent of the combined fatty acid may be employed. We have found it desirable to use in the neighborhood of two equivalents of combined fatty acid per one equivalent of urea.

The above referred to application of Eckey Ser. No. 562,062 discusses fully the subject of catalysts which are suitable in reactions involving the interchange of organic radicals at relatively low temperature. We have found that the same class of materials may be employed in the practice of the present invention, but the constitution of the true catalytic material is not accurately known. Whatever may be the true catalyst, it can be shown that substances which are effective in bringing about the interchange of radicals include compounds which include sodium or potassium, for example, combined with any material less acidic than phenol. Thus various alkoxides such as sodium, potassium, and lithium methoxides, ethoxides, propoxides, and butoxides are suitable as are the corresponding alkoxides made from alcoholic compounds in general such as lauryl alcohol, ethylene glycol, oleic acid monoglyceride, and many others. Also, alkoxides in which the cation is the tetra-substituted ammonium radical such as tetramethyl ammonium methoxide and lauryl benzyl dimethyl ammonium methoxide show activity in promoting the radical interchange. Other substances which may be added to further the reaction at the temperatures herein used are: alkali-metalorganic compounds containing the alkali metal atom directly bound to a carbon atom as in triphenyl methyl sodium, or to a nitrogen atom as in potassium pyrrole; finely divided metallic potassium or sodium in xylene; and an anhydrous suspension of potassium hydroxide in a hydrocarbon solvent such as undecane.

Because of the great variety of materials that may be used to form the active catalyst and because the actual structure of the true catalytic material is not yet accurately known, the catalytic materials have been generally referred to as "low temperature molecular rearrangement catalysts." The same terminology is employed herein, although the temperatures of reaction used may be somewhat higher than those disclosed in Eckey application Ser. No. 562,062.

Amounts of catalyst equivalent to one and a half per cent by weight of sodium methoxide based on the combined weight of the fatty acid ester and the urea have been found suitable. Smaller quantities such as 0.2 per cent are effective in promoting the radical interchange, but we have found that the reaction proceeds at a rather low rate unless 0.5 per cent is employed. Larger amounts of catalyst may be used, but amounts substantially larger than about five per cent are to be avoided in order to avoid the emulsion difficulties accompanying larger usages. The preferred range of catalyst usage is the equivalent of about 0.5 to about 2.5 per cent of sodium methoxide.

The catalysts that are used in practicing the present invention are highly efficient in effecting regrouping of organic radicals, and for this reason it is preferable to render the catalysts inactive after the desired reaction has taken place and before conditions of reaction are allowed to change appreciably so that substantially no modification results during subsequent handling of the reaction mixture. At the end of the reaction, for example, it is preferable to treat the mixture with an acid reacting compound such as hydrochloric acid, phosphoric acid, carbonic acid, glacial acetic acid, etc., and thereby inactivate the catalyst before any undesirable reversion or other change takes place.

In the use of the alkoxide and other catalysts as herein designated, the usual precautions of having the materials dry and neutral, the catalyst finely divided and well dispersed, and of excluding oxygen and carbon dioxide during the reaction preferably should be observed in order to achieve optimum results.

The temperatures employed in the practice of the present invention are such that the acyl ureide formed during reaction will precipitate as a solid phase while at least a portion of the fatty ester and urea remains liquid or in solution.

It is preferable to control the temperature of the reaction mix so that the fatty acid ester is wholly in the liquid phase, thereby establishing conditions favoring intimate contact of the fatty acid ester and the urea. However, the invention is not to be construed as excluding conditions of operation which may favor the existence of some of the fatty acid ester in solid phase. Reaction between the urea and that portion of the ester which is in the liquid phase will take place with the formation of fatty acid ureide even though some solid ester may be present in the reaction mix.

Since the solubility of acyl ureides in the fatty ester or in the urea is very low, relatively high temperatures may be employed without undesirable effect. However, urea decomposes readily on heating much above its melting point. Accordingly the reactions of the present invention are conducted at temperatures below 150° C. and within the range of which the lower limit is the lowest temperature at which at least a portion of the ester is liquid and the upper limit is the highest temperature at which acyl ureide formed in the reaction can crystallize from the reaction mix as it is formed. More specifically we have found that the reaction proceeds at a desirable rate at temperatures from about 40° to 60° C. and that at temperatures within this range a reaction period of 15 to 25 hours is usually sufficient.

In the reaction of the urea with triglyceride fats, it is preferable to use more than one equivalent of combined fatty acid per equivalent of urea. In view of the excess of triglyceride thereby added, the reaction will result in the formation of mono- and/or diglycerides depending on the excess of fat employed. These materials, however, can be readily separated from the fatty acid ureide by suitable solvent washing.

Having thus described our invention, what we claim and desire to secure by Letters Patent is:

1. A process for the production of acyl ureides which comprises contacting a fatty acid ester of an aliphatic polyhydric alcohol with urea in the presence of an amount of a low temperature molecular rearrangement catalyst not substantially exceeding the equivalent of five per cent by weight of sodium methoxide based on the combined weights of the said ester and the said urea, the said contact being made at a temperature below 150° C. and below the decomposition temperature of the urea and within the range of which the lower limit is the lowest temperature at which at least a portion of the said ester is liquid and the upper limit is the highest temperature at which the fatty acid ureide formed in the reaction can crystallize from the reaction mix as it is formed, and maintaining the temperature within said range while progressive crystallization of the fatty acid ureide takes place.

2. The process of claim 1 in which the ester is a fatty acid ester of an aliphatic polyhydric alcohol having not more than 4 carbon atoms.

3. The process of claim 2 in which the temperature of reaction is from about 40° C. to about 60° C.

4. The process of claim 2 in which the mixture after reaction is extracted with a fat solvent to remove unreacted fatty ester and then extracted with water to remove unreacted urea.

5. A process for the production of acyl ureides having from about 8 to about 22 carbon atoms in the acyl radical, comprising contacting an ester of an aliphatic polyhydric alcohol having not more than 4 carbon atoms and a fatty acid having from about 8 to about 22 carbon atoms, with urea in the presence of an amount of low temperature molecular rearrangement catalyst not substantially exceeding the equivalent of five per cent by weight of sodium methoxide based on the combined weights of the said ester and the said urea, the said contact being made at a temperature below 150° C. and below the decomposition temperature of the urea and within the range of which the lower limit is the lowest temperature at which at least a portion of the said ester is liquid and the upper limit is the highest temperature at which the fatty acid ureide formed in the reaction can crystallize from the reaction mix as it is formed, and maintaining the temperature within said range while progressive crystallization of the fatty acid ureide takes place.

6. A process for the production of acyl ureides comprising contacting a fatty acid triglyceride with urea in the presence of a substantially inert triglyceride-urea mutual solvent having substantially no solvent action for the acyl ureide formed, and in the presence of an amount of a low temperature molecular rearrangement catalyst not substantially exceeding the equivalent of five per cent by weight of sodium methoxide based on the combined weights of the said triglyceride and urea, the said contact being made at a temperature below 150° C. and below the decomposition temperature of the urea and within the range of which the lower limit is the lowest temperature at which at least a portion of the said triglyceride is liquid and the upper limit is the highest temperature at which the fatty acid ureide formed in the reaction can crystallize from the reaction mix as it is formed, and maintaining the temperature within said range while progressive crystallization of the fatty acid ureide takes place.

7. A process for the production of a mixture of acyl ureides having from about 8 to about 22 carbon atoms in the acyl radical comprising contacting a natural triglyceride fat constituted of combined fatty acids having from about 8 to about 22 carbon atoms in the acyl radical with urea in the presence of a substantially inert triglyceride-urea mutual solvent having substantially no solvent action for the acyl ureides formed, and in the presence of an amount of a low temperature molecular rearrangement catalyst not substantially exceeding the equivalent of five per cent by weight of sodium methoxide based on the combined weights of the said triglyceride fat and urea, the said contact being made at a temperature below 150° C. and below the decomposition temperature of the urea and within the range of which the lower limit is the lowest temperature at which at least a portion of the said triglyceride fat is liquid and the upper limit is the highest temperature at which the fatty acid ureide formed in the reaction can crystallize from the reaction mix as it is formed, and maintaining the temperature within said range while progressive crystallization of the fatty acid ureide takes place.

8. The process of claim 7 in which the low temperature molecular rearrangement catalyst is finely divided alkali metal alkoxide.

9. The process of claim 7 in which the low temperature molecular rearrangement catalyst is finely divided sodium methoxide.

10. The process of claim 7 in which the triglyceride fat is coconut oil.

11. The process of claim 7 in which the triglyceride fat is cottonseed oil.

12. The process of claim 7 in which the triglyceride fat is soybean oil.

EDDY W. ECKEY.
ANDREW DOYLE ABBOTT.

REFERENCES CITED

The following references are of record in the file of this patent:

UNITED STATES PATENTS

| Number | Name | Date |
| --- | --- | --- |
| 1,787,483 | Lacy | Jan. 6, 1931 |
| 2,090,594 | Jacobson | Aug. 17, 1937 |
| 2,358,072 | Inman | Sept. 12, 1944 |